A. BERNIER.
PNEUMATIC TIRE.
APPLICATION FILED MAR. 18, 1910.

1,002,214.

Patented Sept. 5, 1911.

Witnesses,
Wallace C. Parsons
Gardner M. Burgess

Inventor,
Alsime Bernier.
per L. Schofield
Attorney.

UNITED STATES PATENT OFFICE.

ALSIME BERNIER, OF PROVIDENCE, RHODE ISLAND.

PNEUMATIC TIRE.

1,002,214.  Specification of Letters Patent.  Patented Sept. 5, 1911.

Application filed March 18, 1910. Serial No. 550,248.

*To all whom it may concern:*

Be it known that I, ALSIME BERNIER, a citizen of the United States, residing at Providence, in the State of Rhode Island, have invented a new and useful Improvement in Pneumatic Tires, of which the following is a specification.

The nature of my invention consists in the improved combination of crescent shaped inflated elements and an annular holding member, with the inflated tube and the outer covering of a pneumatic tire as hereinafter set forth.

Figure 1:
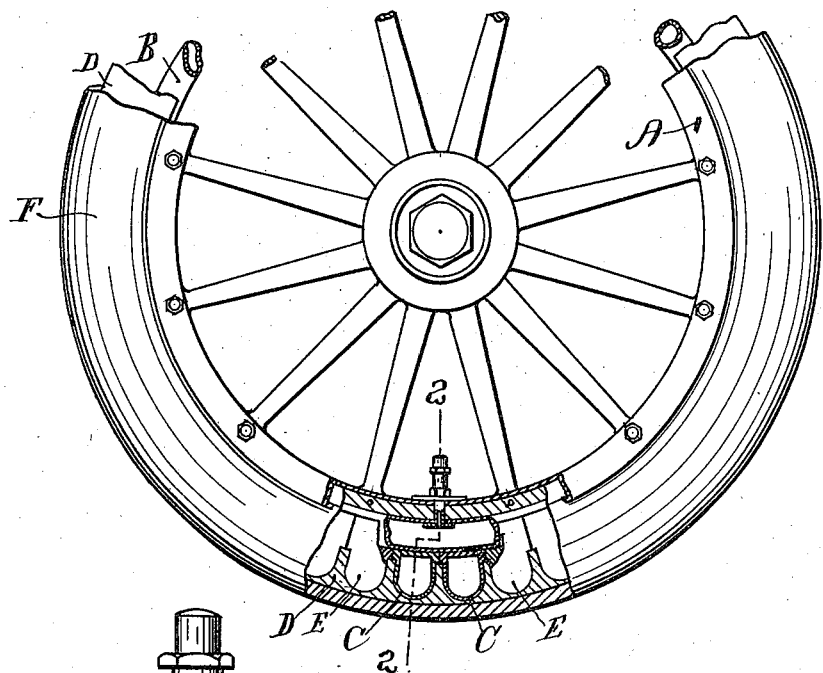
Figure 2:
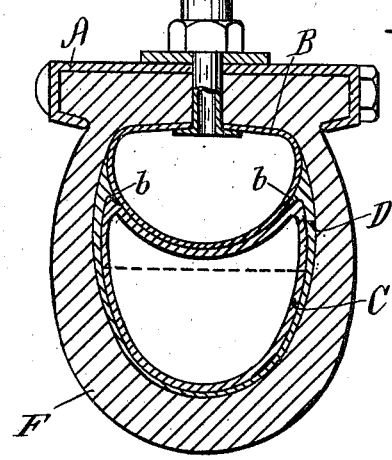
Figure 3:
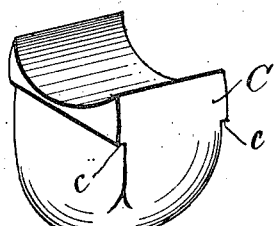
Figure 4:
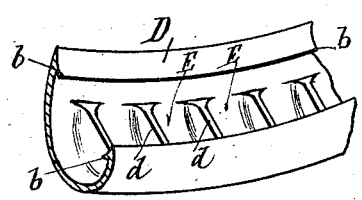
Figure 5:
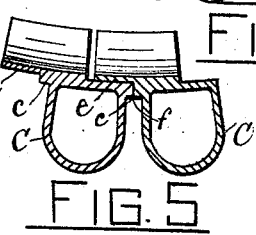

In the accompanying drawings:—Figure 1 represents a partial longitudinal section of a pneumatic tire embodying my improvement. Fig. 2 represents an enlarged transverse section taken in the line 2, 2, of Fig. 1. Fig. 3 represents an enlarged perspective view of one of the inflated elements. Fig. 4 represents a perspective view showing the construction of the annular number for holding the crescent shaped inflated elements. Fig. 5 represents a sectional view showing a modification.

In the drawing, A represents the rim of the wheel, and B is the annular inflatable rubber tube. The crescent shaped elements C, C, are held in the pockets E, E, formed at the inner side of the annular flexible holding member D, the said holding member being provided with the inwardly turned edges b, b, as shown in Fig. 4, which serve to retain the elements C, C, in the said pockets. The inflated elements C, C, are provided with the external shoulders c, c, which are arranged to bear upon the edges of the partitions d, d, between the pockets E, E, of the annular holding member D, and by this means the said elements will be properly supported when the tire is being used under pressure. The inflated elements C, C, and the inflatable rubber tube B, are inclosed for attachment to the wheel A, within the attaching tread F.

In the modification shown in Fig. 5, a projecting flap e is employed which laps onto the succeeding element, whereby the joint f between the said elements will be covered.

I claim as my invention:

1. In a pneumatic tire, the combination of an annular flexible holding member, provided at its inner side with a series of receiving pockets with intervening partitions and with inwardly turned edges, inflated elements made crescent shaped in cross-section and held in the pockets of the said holding member and having external shoulders which bear upon the edges of the partitions between the said pockets, whereby the said elements will be supported when the tire is being used under pressure, an inflated rubber tube pressing upon the said inflated elements, and the tire tread which serves for attachment to the rim of the wheel.

2. In a pneumatic tire, the combination of an annular holding member provided with a series of receiving pockets at its inner side with intervening partitions, inflated elements made crescent shaped in cross-section and having external shoulders which bear upon the edges of the partitions between the said pockets, and also have a projecting flap for lapping contact with the inner side of the adjoining inflated element, with an inflated rubber tube, and the tire tread which serves for attachment to the rim of the wheel.

ALSIME BERNIER.

Witnesses:
SOCRATES SCHOLFIELD,
BENJAMIN L. DENNIS.